Sept. 26, 1967 G. D. KOEIJMANS 3,344,407

HYBRID SEISMIC PROCESSING SYSTEM

Filed Dec. 29, 1964 10 Sheets-Sheet 1

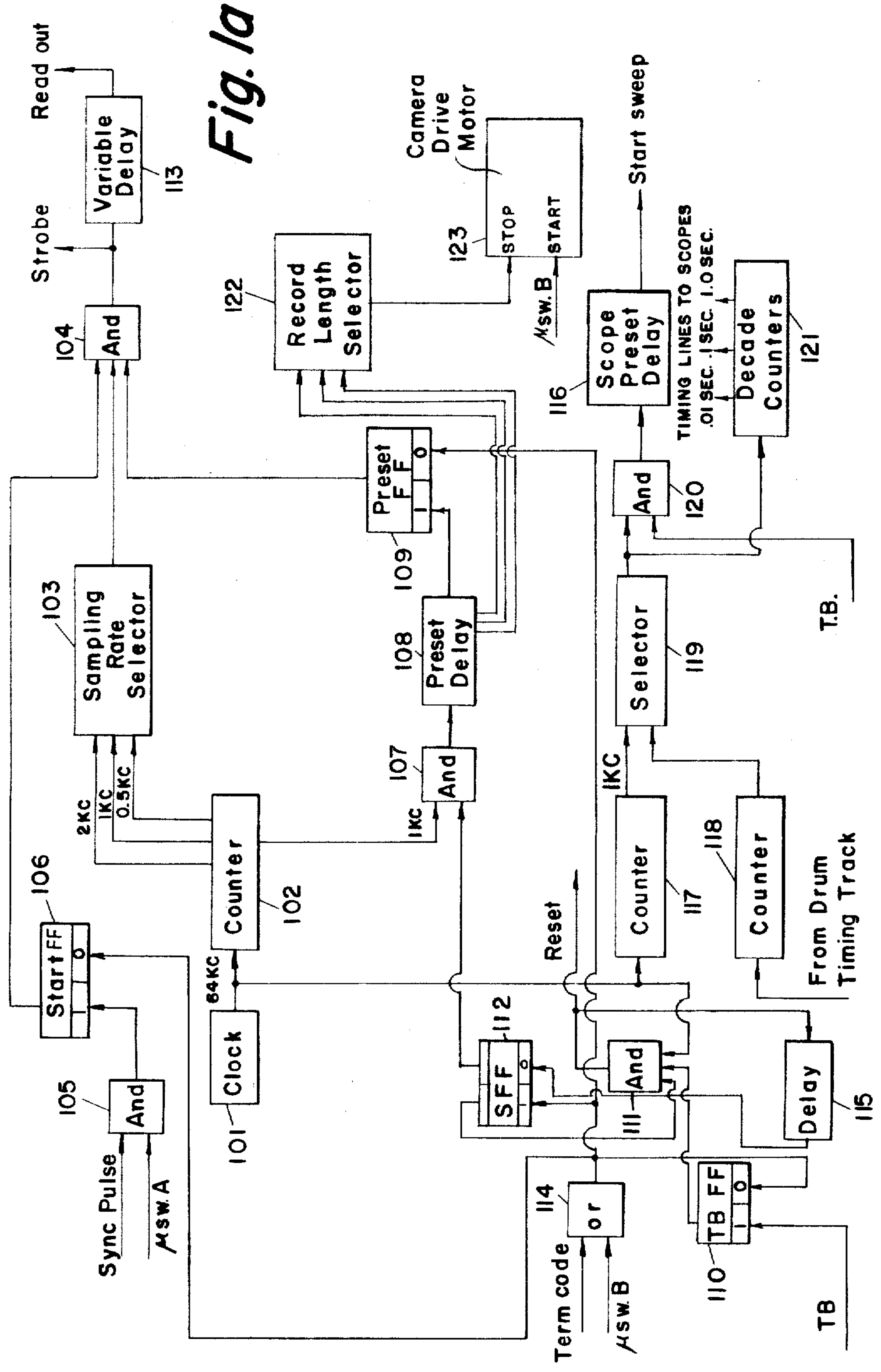
Fig. Ia

United States Patent Office 3,344,407
Patented Sept. 26, 1967

3,344,407

HYBRID SEISMIC PROCESSING SYSTEM

Gerard D. Koeijmans, Dallas, Tex., assignor to Mobil Oil Corporation, a corporation of New York Filed Dec. 29, 1964, Ser. No. 425,668
12 Claims. (Cl. 340—172.5)

ABSTRACT OF THE DISCLOSURE

A hybrid data processing system including a control unit which synchronizes the operation of an analog processing system with the operation of a digital computer.

The control unit includes a source of clock pulses and gating circuitry for initiating the operations in response to selected ones of the clock pulses.

A visual monitor and a digital-to-analog converter are provided so that data which is being digitized for input to the digital computer can be visually monitored while it is being digitized to insure that the quality of the data is adequate for proper use of the data by the computer.

This application is a continuation-in-part of application Ser. No. 356,532, filed Apr. 1, 1964, now abandoned.

This invention relates to methods of and a system for processing seismic data by concurrent use of both analog and digital equipment.

Exploration geophysicists process seismic information in a number of ways which makes this information easier to understand and interpret. Most commonly, the seismic information is in the form of seismograms which represent the reflections of seismic energy from subsurface reflecting interfaces. These seismograms are recorded on a reproducible medium in the field. In this state, they contain multiples, ghosts, and other noise signals which interfere with the interpretation of the reflections on the seismogram.

In order to more easily interpret these seismograms, they are processed in different ways. One category of seismogram processing employs routine analog operations. Examples of such analog operations are the application of time corrections to the seismogram, conventional filtering of the seismograms to remove certain classes of noise, and the preparation of record sections from the seismograms. Another category of processing includes what are sometimes referred to as special analog operations. These operations include inverse filtering, feedback methods for removing ghosts and multiples, the use of special operators for removing reverberations, and the processing of synthetic seismograms. Still another category of processing includes problems which must be performed on a digital computer. These problems include the use of correlation and convolution techniques, and multiple reflection calculations.

The requirements of routine analog operation are met by a simple magnetic tape playback system. Special analog operations cannot be performed satisfactorily with conventional analog equipment or with a digital computer singly. Rather, a combination of analog and digital equipment must be used. As an example, the feedback method of removing multiples and ghosts requires an accurate multi-channel delay line which is capable of time delay increments in one millisecond steps over a wide range of delays. Magnetic tape of drum units are not always suitable for providing these delays. Furthermore, the repeated use of magnetic tapes or drums for delays introduces an unacceptable level of distortion into the seismograms. These problems may be overcome by converting the seismograms to digital form and storing the digital representations in the digital computer for the required time increments. The digital representations are converted back to the analog form to complete the desired special analog operation. These conversion steps require accurate timing between the analog system and the digital system.

Furthermore, when the digital computer is used as a multi-channel delay line, it is necessary to obtain a visual display of the seismic data which is being operated upon so that the delays may be manually adjusted by an operator on the basis of the final results. As an example, inverse filtering requires special filters which are adjusted by an operator on the basis of the results displayed on a monitor. All of this requires that a visual monitor, such as an oscilloscope, be accurately timed with the analog and digital systems.

In operations involving only the digital computer, it is necessary to convert the field seismograms to digital representations for input to the digital computer. Visual monitoring should be provided in the analog-to-digital conversion system to supervise accurate digitizing. Most prior seismic systems utilizing analog-to-digital converters have no means of monitoring the quality of information that is inserted into the digital computer. Consequently, time and money are lost during the operation of a large digital computer for sometimes worthless data. Accordingly, a system which converts the digital information on digital tape back to analog form requires monitoring by an oscilloscope.

In these operations in which analog seismograms are read out of the reproducible medium and digitized, it is often desirable to delay the digitizing for a selected time increment after the beginning of the seismogram. For example, it is often desirable to perform an operation only on a selected portion of the seismogram. This can be accomplished by providing a preset delay between the beginning of the seismogram and the initiation of the digitizing pulses. Means should also be provided for initiating these digitizing pulses only in response to a signal from the computer indicating that it is ready to receive a digital input and for terminating the digitizing pulses in response to a signal from the computer indicating that it can handle no more digital data.

When only a selected portion of the seismogram is being operated upon, means must be provided for delaying the start of the sweep of the visual monitor so that only that portion of the seismogram which is of interest will be displayed. For example, the start of the sweep of the oscilloscope must be synchronized with the output of the digital-to-analog converter.

In accordance with one aspect of my invention, the above requirements of a seismic prospecting system are met with a combination of analog and digital equipment which is operated by a hybrid control unit which accurately times the synchronous operation of both analog and digital equipment.

In accordance with another aspect of my invention, means are provided for digitizing seismic data in analog form and concurrently converting the digital representations back to a form which can be displayed on a visual monitor so that the quality of the digitizing operation can be checked.

In accordance with another aspect of my invention, means are provided for selecting a preset delay between the beginning of a seismogram and the initiation of pulses which digitize this seismogram so that only a selected portion of the seismogram will be digitized.

In accordance with another aspect of my invention, means are provided for synchronizing the oscilloscope sweep start and a recording oscillograph camera record length so that a desired portion of a seismic trace will be displayed.

In accordance with another aspect of my invention, there is provided a hybrid control unit which includes a source of accurately timed clock pulses and means for timing the operations of all of the analog and digital equipment under control of these clock pulses.

In accordance with still a further aspect of my invention, there is provided a method of using a digital computer register as a multi-channel delay device for processing seismic data to remove interfering noise.

The foregoing and other objects, features and advantages of this invention will be better understood from the following more detailed description and appended claims in conjunction with the drawings in which:

FIG. 1 is a block diagram of the hybrid seismic processing system of this invention;

FIG. 1*a* is a block diagram of the hybrid control unit;

Figure 5A:
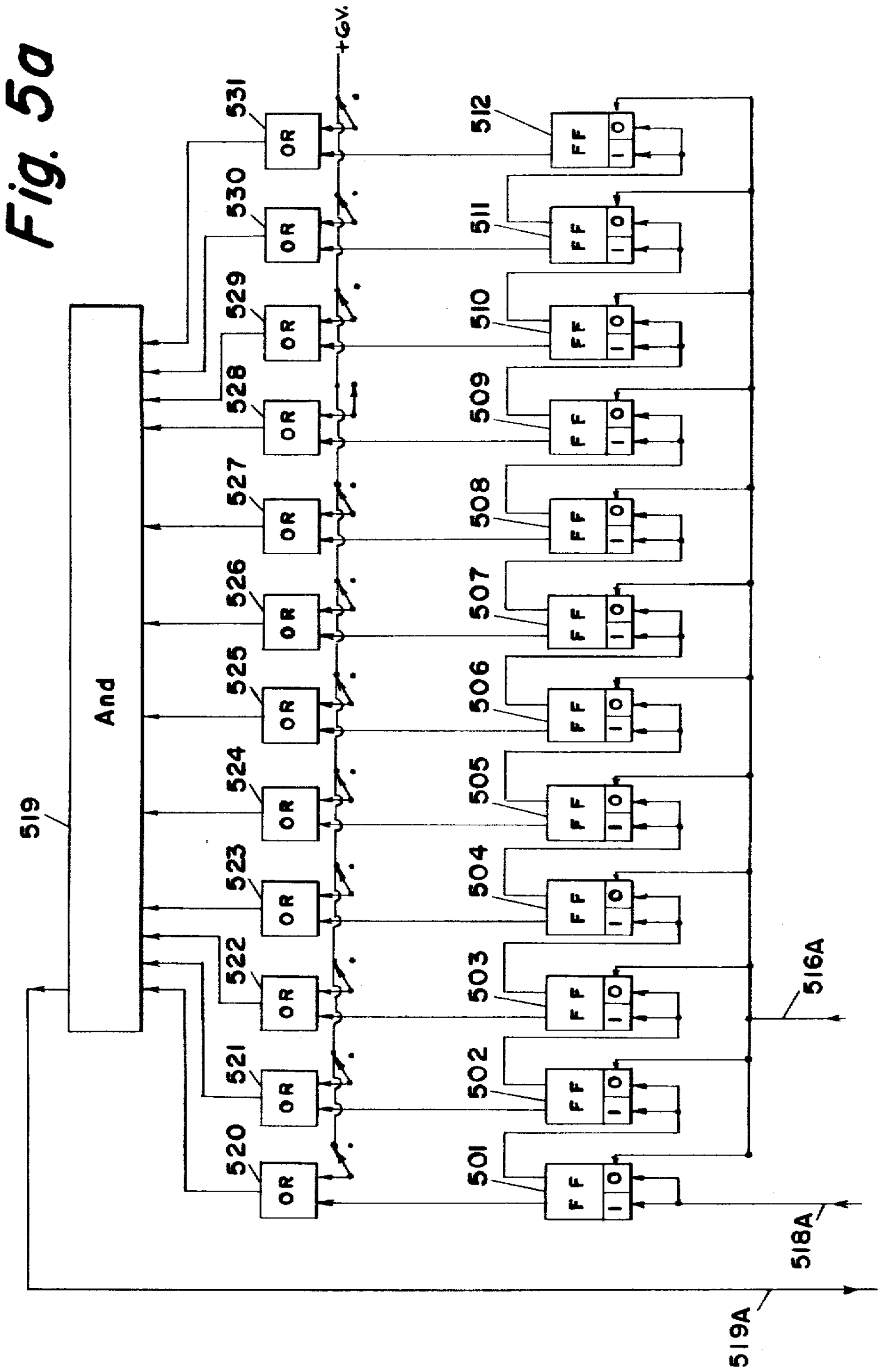
Figure 5B:
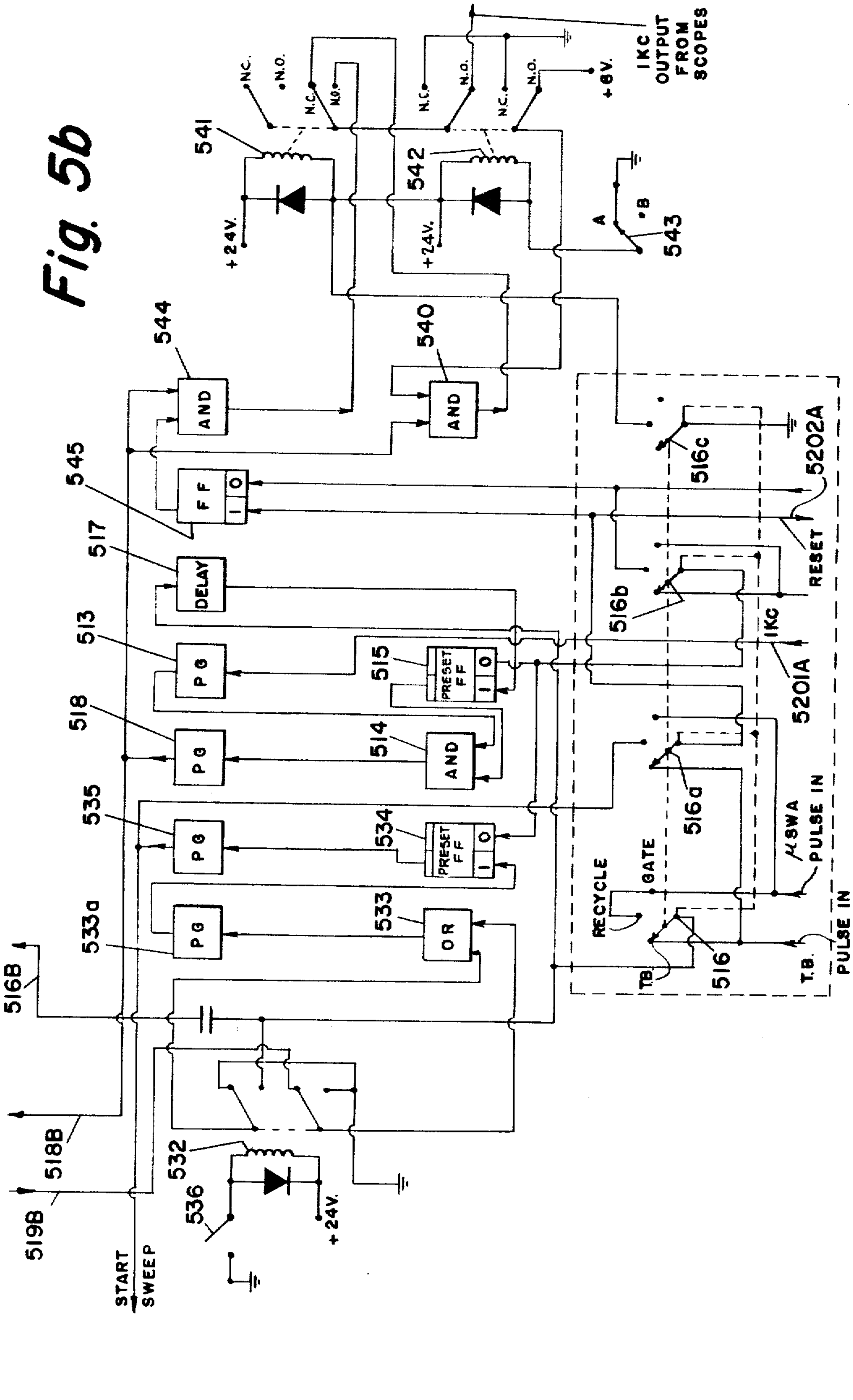
Figure 6:
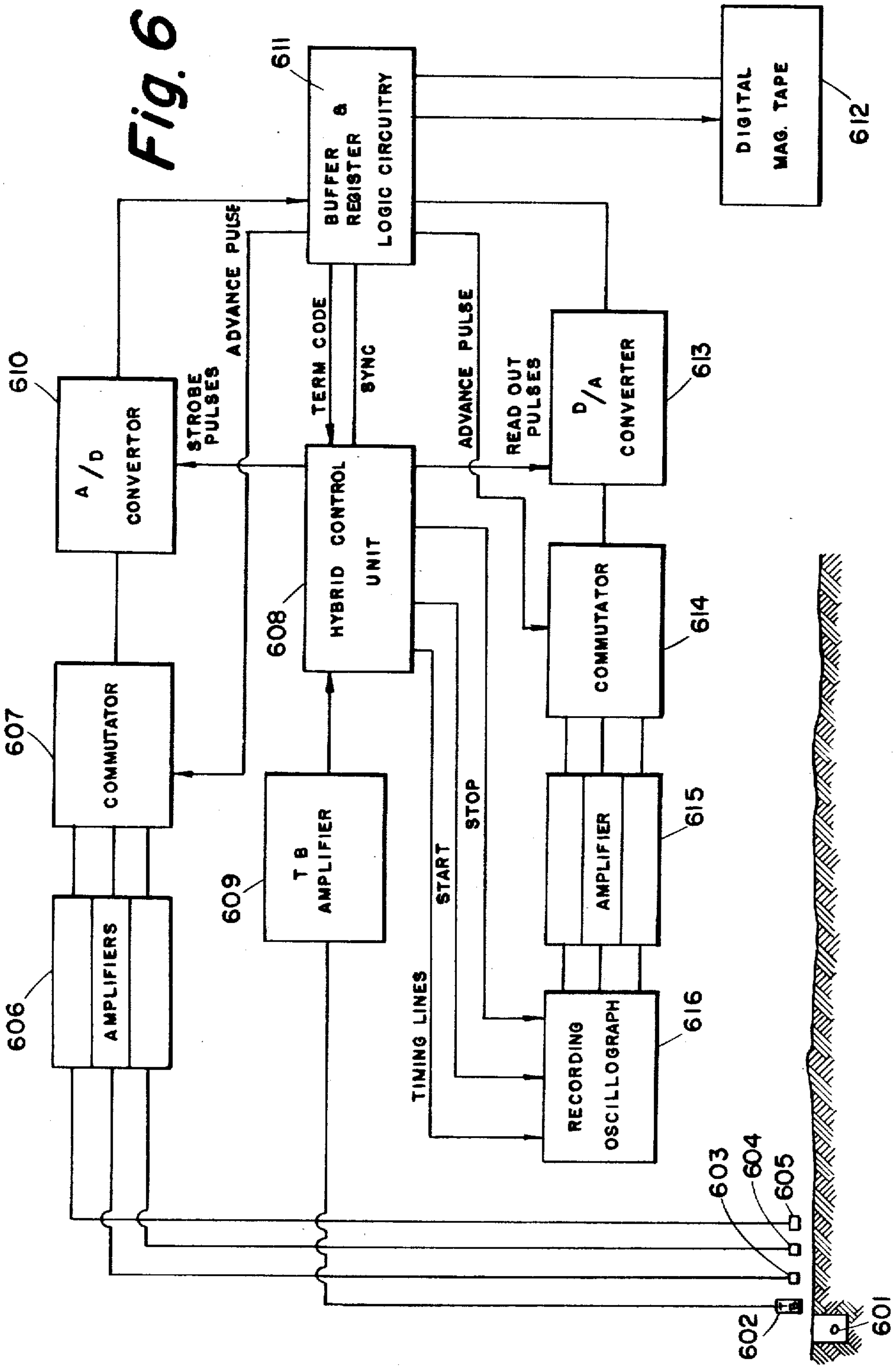
Figure 7:
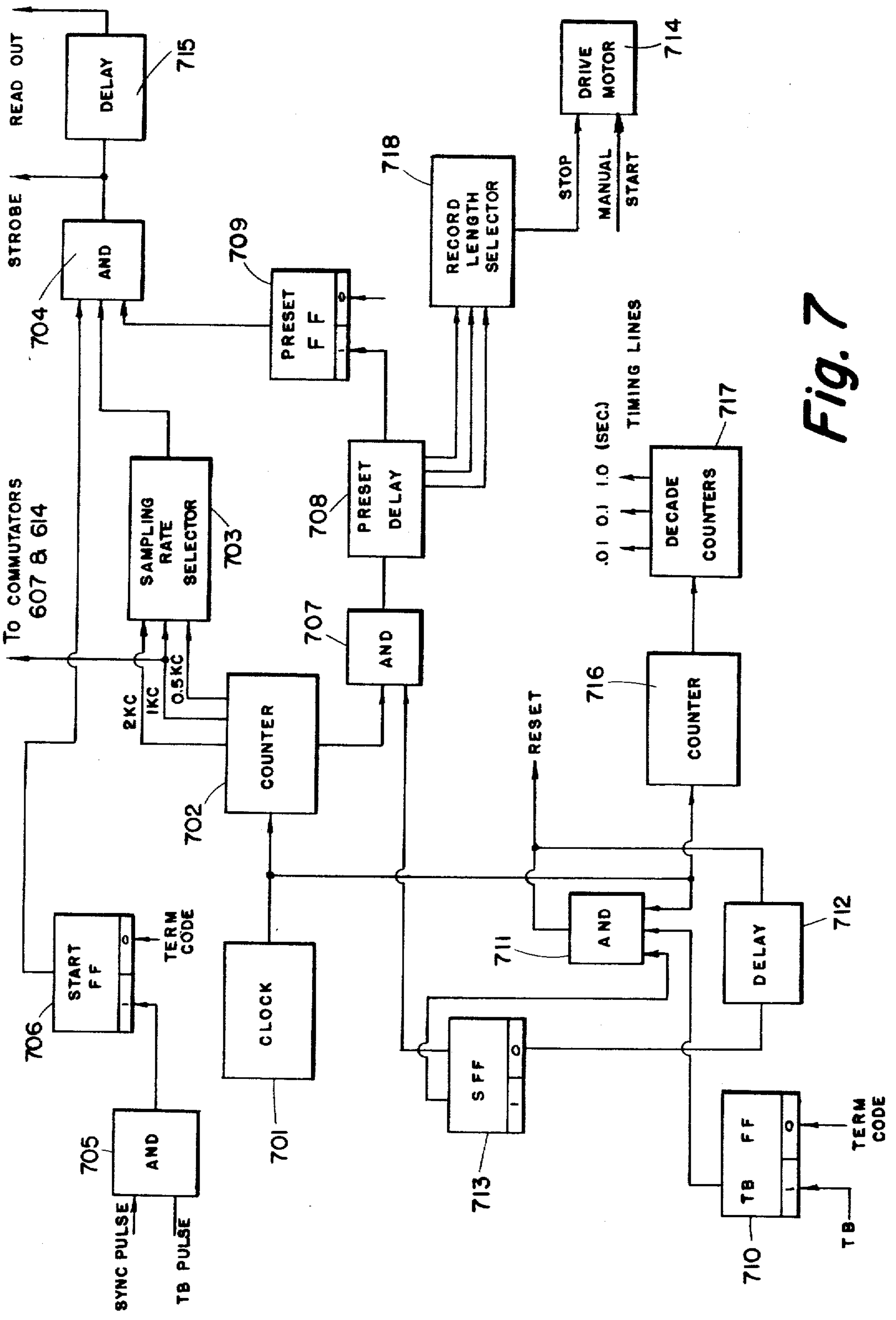
Figure 8:
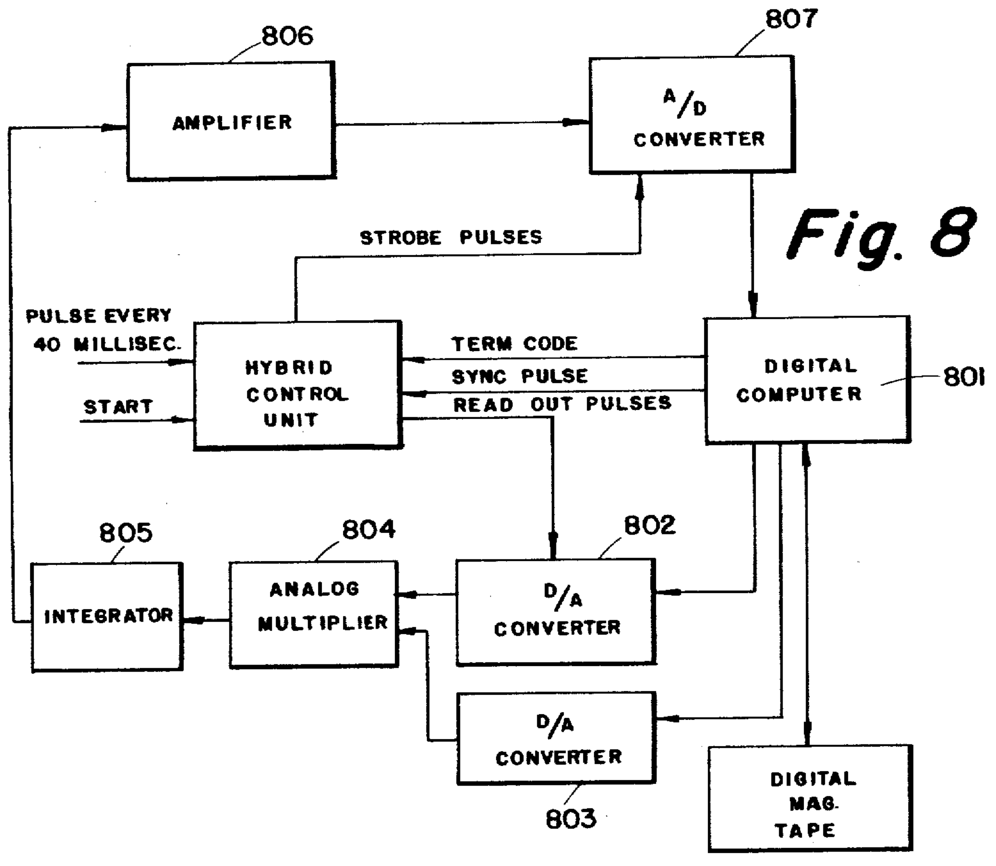
Figures 8A, 8B, 8C:
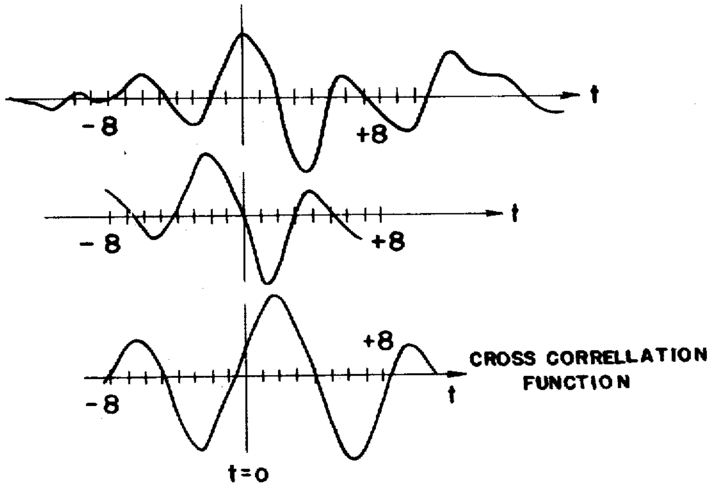

FIGS. 5*a* and 5*b* together show the scope preset circuitry of the hybrid control unit;

FIG. 6 shows a block diagram of the digital field recording system;

FIG. 7 shows the details of the hybrid control unit for the recording system of FIG. 6;

FIG. 8 shows the processing system of this invention arranged for hybrid correlation;

FIGS. 8*a* and 8*b* show data traces; and

FIG. 8*c* shows the cross-correlation function for the two data traces.

Figure 1:
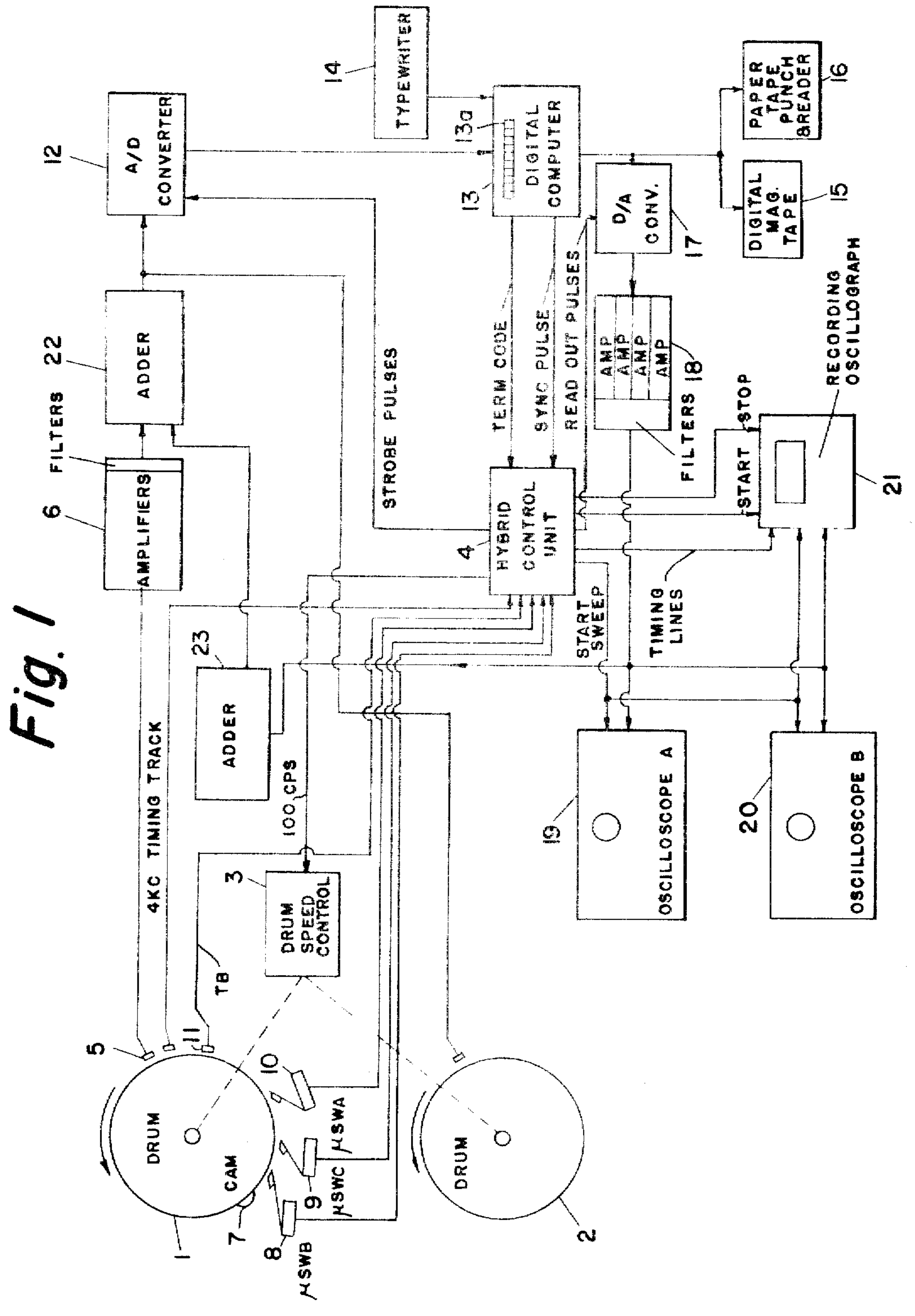

Referring now to FIG. 1, there is shown a block diagram of the important components of the hybrid seismic processing system. There are shown two magnetic drums 1 and 2 having a common drive and a common speed control circuit 3. As will be subsequently explained, circuitry in the hybrid control unit 4 provides accurate 100 c.p.s. timing signals for controlling the speed of the drums 1 and 2. Field seismograms are commonly recorded on a reproducible medium such as the magnetic tape carried by the drums 1 and 2. There is shown a pickup head 5 associated with the drum 1 for reproducing these field seismograms in analog form for application to the seismic amplifiers and filters 6. The drum 1 carries a cam 7 which actuates certain microswitches as the drum rotates. These microswitches, when actuated, provide signals which are used in the timing of the analog and digital equipment. The microswitches 8–10 are shown and these microswitches respectively produce the microswitch B pulse, microswitch C pulse and microswitch A pulse when they are actuated. These signals are applied to the hybrid control unit 4.

Normally, time-break pulses are recorded on the magnetic tape and these time-break pulses are indicative of the start of the field seismogram. These time-break pulses may be recorded on the same magnetic tape channels as the seismograms themselves, or may be recorded on a separate channel. It has been assumed that the time-break pulses are recorded on a separate channel of magnetic drum 1. A separate pickup head 11 is provided to sense the time-break pulses and apply them to hybrid control unit 4.

The drums 1 and 2, together with the seismic amplifiers and filters 6, are common components in an analog seismic processing system. The drums may, for example, be an SIE magnetic tape recorder having 56 channels available from Dresser SIE, Inc., 10201 Westheimer, P.O. Box 2928, Houston, Texas 77001. As is well known in analog seismic processing, there must be provided a plurality of modulators and demodulators for the drums together with stepping switches and associated circuitry for selecting particular seismic traces, or seismograms, from the drums 1 and 2 and for rerecording the seismograms on the drums. This conventional analog circuitry has been omitted from this specification for purposes of clarity.

The outputs of the amplifiers and filters 6 may be converted to digital form in the analog-to-digital converter 12. One commonly available analog-to-digital converter suitable for this purpose is the Texas Instruments Model No. 834B05 Analog-To-Digital Converter. The digitized seismograms provide an input to the digital computer 13. The Control Data Corporation's 160–A Digital Computer is a system which meets the requirements of the present invention. The digital computer 13 has associated input-output equipment including typewriter 14, digital magnetic tape 15 and a unit 16 including a paper tape punch and a paper tape reader.

Digitized seismograms are read into and out of the digital computer under the control of pulses from the hybrid control unit 4. The hybrid control unit 4 produces a series of strobe pulses which are applied to analog-to-digital converter 12 to digitize seismograms. The hybrid control unit 4 also produces a plurality of readout pulses which are applied to a digital-to-analog converter 17 which accepts the digital output of digital computer 13 and converts this output back to analog form. In order to synchronize the operation of the digital computer 13 with the rest of the system, the digital computer 13 produces a sync pulse output when it is ready to accept information. The digital computer 13 also produces a termination code output when it has received the programmed amount of information. Both of these signals are applied to the hybrid control unit 4.

The outputs of digital-to-analog converter 17, which may be multi-channel seismic signals, are applied to the seismic amplifiers and filters 18. The processed seismic signals may be displayed visually on the oscilloscopes 19 and 20 or may be rerecorded on magnetic drum 2, or may be applied to the recording oscillograph 21 to produce a visual record of the processed seismic trace. The oscilloscopes 19 and 20 are operated under the control of the hybrid control unit 4 so that the sweep of the oscilloscope is timed to start coincidentally with the readout of the seismogram from the digital-to-analog converter 17. The recording oscillograph 21 is also operated under control of hybrid control unit 4. The oscillograph camera drive can be started automatically when microswitch B is actuated and runs until the selected record length time is reached.

*Operation of the hybrid data processing system for processing geophysical data with the digital computer used as a multi-channel electronic delay line*

In order to provide a delay line which introduces a lower level of distortion and noise than that which is inherent in rotating magnetic drum delay lines, the storage capacity of the digital computer is used to store digital representations of the seismic traces for the desired delay increments.

An example of seismic processing requiring an accurate multi-channel delay line is disclosed in application of Robert J. Watson, Ser. No. 147,588, filed Oct. 25, 1961, now U.S. Patent 3,131,375, for Multiple Removal System. The feedback technique of removing multiples and ghosts from seismograms of that application requires an accurate multi-channel delay line capable of accurate time increments of 1 millisecond steps over a wide range of delay. A digital computer is quite adequate for the feedback method provided that communication and control are established between the analog input of the geophysical signal and the digital computer. This communication and control is provided by the hybrid control unit of this invention.

Before describing the hybrid control unit in more detail, there will be described the operation of the hybrid data processing system, FIG. 1, in processing seismograms with the digital computer used as a delay device.

A particular seismogram is selected from the magnetic drum 1 and applied to one of the amplifiers and filters 6. The amplified and filtered seismogram is then applied to an adder 22 wherein it is added to a cancellation signal which is generated by the feedback system. The adder 22 may be of the type including a resistance network for summing two or more voltages. The adder 22 is shown in block form to indicate that many channels of addition may be performed therein.

The output of adder 22 is applied to analog-to-digital converter 12 for conversion at a rate determined by the strobe pulses of the hybrid control unit 4. The digitized representation of the seismogram is then stored in one of the registers 13*a* of the digital computer 13. As is well known to those familiar with digital computers, all digital computers include a large number of storage locations or registers for storing multi-bit digital numbers. The digital representations of the seismogram are stored in selected ones of these registers until the computer is instructed to read them out. The seismogram can be read out of digital computer 13 at a number of different delayed times. These delayed times may be controlled by the typewriter 14.

For example, the operator can command the computer, by means of typewriter 14, to read out the seismogram at six different delayed times. This gives rise to six different functions of the seismogram, each having a different delay time. These delayed functions are converted to analog form in six different channels of digital-to-analog converter 17 at a rate controlled by the readout pulses from hybrid control unit 4. After being converted to analog form, the six delayed functions are applied to six different channels of amplifiers 18 for adjustment in polarity and amplitude. Six outputs of amplifiers 18 are monitored on six different channels of oscilloscope 19. The six amplified functions are also applied to adder 23 thereby producing a cancellation function. The polarity and phase of this cancellation function may be adjusted by means of the amplifiers 18. The outputs of adders 22 and 23 may be applied to one of the oscilloscopes 19 or 20 for monitoring so that the operator can select the proper phase and magnitude. The cancellation signal is added to the original seismogram in adder 22. By visually observing the results of the application of the cancellation signal to the seismogram, and adjusting the time delay introduced by the digital computer and by adjusting the phase and amplitude of the fed back cancellation signal, there can be produced a multiple-free seismogram which is visually observed on oscilloscope 19 and recorded on magnetic drum 2.

All of the components shown in block form in FIG. 1 and described above are standard commercially available items except the hybrid control unit 4 which provides the means for synchronizing all of the other components and for operating them as a single data processing system.

The hybrid control unit is shown in block form in FIG. 1*a* and is shown in more detail in FIGS. 2, 3, 4, 5*a* and 5*b*.

*Hybrid control unit, FIG. 1a*

Referring now to FIG. 1*a*, there is shown a clock 101 which provides a source of accurately timed 64 kc. clock pulses. These clock pulses are used to time the various operations which are performed by the hybrid data processing system.

One of these operations is the generation of strobe pulses which digitize a seismic trace so that it may be inserted into the digital computer. Similarly, readout pulses must be generated to read the digitized information out of the digital computer, transform it to analog form, and transfer it back to the analog portion of the system. These strobe and readout pulses must be initiated in synchronism with the magnetic drums which carry the analog information. Further, it is often desirable to delay the initiation of the strobe pulses after the beginning of the readout of the analog seismic trace so that only a particular portion of the seismic trace may be digitized.

In order to provide strobe pulses at different sampling rates, the 64 kc. clock pulses are counted down in a binary counter 102. The stages of this counter provide a 2 kc. output, a 1 kc. output, and a .5 kc. output. These outputs are applied to a sampling rate selector 103 by means of which the operator can select the sampling rate from one of the three inputs applied to the selector. The selected sampling rate pulses for the strobe and readout pulses are applied to an AND gate 104. The output of AND gate 104 is the strobe pulse output to the analog-to-digital converter.

The initiation of this train of strobe pulses must be timed so that it occurs when the computer is ready for new digitized samples and it must be timed so that the pulse train starts at a selected time after the time-break signal. In order to synchronize the initiation of these pulses to start after the computer is ready for digitized samples, AND gate 105 and a start flip-flop 106 are provided. When the computer is ready for digitized samples, it produces a sync pulse which is applied to AND gate 105. Upon the occurrence of the next microswitch A pulse produced by the magnetic drum 1, the AND gate 105 produces a pulse which sets start flip-flop 106 to the 1 condition. When flip-flop 106 is in the 1 condition, one of the conditions for passing strobe pulses through AND gate 104 is satisfied.

The other condition is satisfied by the preset delay circuitry including AND gate 107, preset delay counter 108 and a preset flip-flop 109. The preset delay circuitry delays the initiation of the strobe pulses for a selectable increment of time after the beginning of the readout of the analog seismic trace from the drum. In this manner, only a selectable portion of the seismic trace is digitized. At the beginning of the readout of the analog seismic trace from the drum, the time-break pulse sets the time-break flip-flop 110 to the 1 condition. This enables an AND gate 111 to pass the next clock pulse and thereby set a squelch flip-flop 112 to the 0 condition through delay 115. The zero output of squelch flip-flop 112 enables AND gate 107 to pass 1 kc. pulses to the preset delay counter 108. The preset delay counter counts a selected number of these 1 kc. pulses and after this selected number has occurred, the preset delay counter 108 produces an output which sets the preset flip-flop 109 to the 1 condition. This enables AND gate 104 to pass strobe pulses to the analog-to-digital converter and thereby initiate the digitizing of the seismic trace.

These same strobe pulses are also used to produce readout pulses which convert a digitized seismic trace back to analog form. In certain operations, it is desirable to have a delay between a strobe pulse, which digitizes a trace, and a readout pulse which converts the digital trace back to analog form. In order to provide this delay, a variable delay unit 113 is provided. This variable delay unit 113 provides a delay between a strobe pulse and a readout pulse so that the digital computer can perform the necessary operations on the seismic trace before it is converted back to analog form.

The digitizing of seismic traces by the strobe pulses is terminated by either a termination code pulse from the computer indicating that the computer has received all of the information it can handle, or by the microswitch B pulse. The termination code pulse and the microswitch B pulse are applied to OR gate 114. The termination code pulse or the microswitch B pulse will set preset flip-flop 109 back to the 0 condition thereby disabling AND gate 104 and terminating the train of strobe pulses. Either of these pulses will also set the squelch flip-flop 112 back to the 1 condition and time-break flip-flop 110 back to the 0 condition.

When the squelch flip-flop 112 is set to the 1 condition, the AND gate 111 is enabled to pass the next 64 kc. clock pulses when the time break sets time-break flip-flop 110 to the 1 condition. This pulse is used to reset all of the counters to place them in a condition for the next cycle in which a seismic trace is read out. The reset pulse is delayed for a short interval of time in the delay circuit 115 which then sets the squelch flip-flop 112 to the 0 condition. The squelch flip-flop 112 is in the 1 condition only for a period of time between the termination code pulse and the next time-break pulse. It is only during a short interval of time that AND gate 111 is enabled to produce a single reset pulse. In this manner, there has been avoided the possibility that reset pulses will be produced during the time that the counters are counting thereby preventing incorrect operation.

When the initiation of the digitizing of a seismic trace is being delayed by the preset delay circuitry just described, it is also desirable to delay the initiation of the sweeps of the oscolloscope so that the sweep will start when the first digitized traces are converted back to analog form. In order to provide this selectable scope delay, a scope preset delay circuit 116 is provided. The input pulses to this scope preset delay circuit may be derived from the 64 kc. clock pulses or it may be derived from a timing track on the drum. The 64 kc. clock pulses are applied to a counter 117 which produces a 1 kc. train of pulses at the output thereof. The 4 kc. drum timing track pulses are applied to a counter 118 which also produces a 1 kc. train of pulses at the output thereof. The operator may select either of these trains by means of the selector 119. The selected 1 kc. train of pulses is applied to AND gate 120. Upon the occurrence of a time-break pulse, these 1 kc. pulses are passed through AND gate 120 to the scope preset delay circuit. At a selected increment of time after the time-break pulse, the scope preset delay circuit 116 produces a pulse which starts the sweep of the oscilloscope. In this manner, the start of the sweep can be timed to occur in synchronism with the conversion of the seismic trace back to analog form by the digital-to-analog converter or at any selected time after the time-break pulse, which time may be independent of the digitizing process.

The 1 kc. train of pulses selected by selector 119 is also used to provide timing lines for the oscilloscopes. Decade counters 121 divide the 1 kc. pulse train down to provide timing lines at every .01 second, every .1 second and every 1.0 second.

The other significant function performed by the hybrid control unit of FIG. 1*a* is the selection of the record length for the oscillograph camera. It is desirable to start the oscillograph camera in synchronism with the readout of the digital-to-analog converter so that the analog trace starts at the beginning of the oscillograph camera record. Since the camera motor requires a small amount of time to get up to its selected speed, it is started when microswitch B is actuated. In order to select the record length, record length selector circuitry 122 is provided. The outputs of the preset delay counter 108 are applied to the record length selector. These outputs occur at different time intervals after the time-break signal. Record length selector 122 provides means for the operator to select one of these pulses for stopping the camera drive motor 123. The camera drive motor 123 is started by the microswitch B pulse.

There has now been described in general terms the operation of the hybrid control unit. There will now be described FIGS. 2, 3, 4, 5*a* and 5*b* which show the detailed circuitry of the hybrid control unit. In the following description, reference will be made to AND gates, OR gates, flip-flops, pulse generators and delay devices. All of these components are well known in the digital computer art and may be such as those described in Digital Computer Components and Circuits, R. K. Richards, D. Van Nostrand Co., Inc., 1957.

Figure 2:
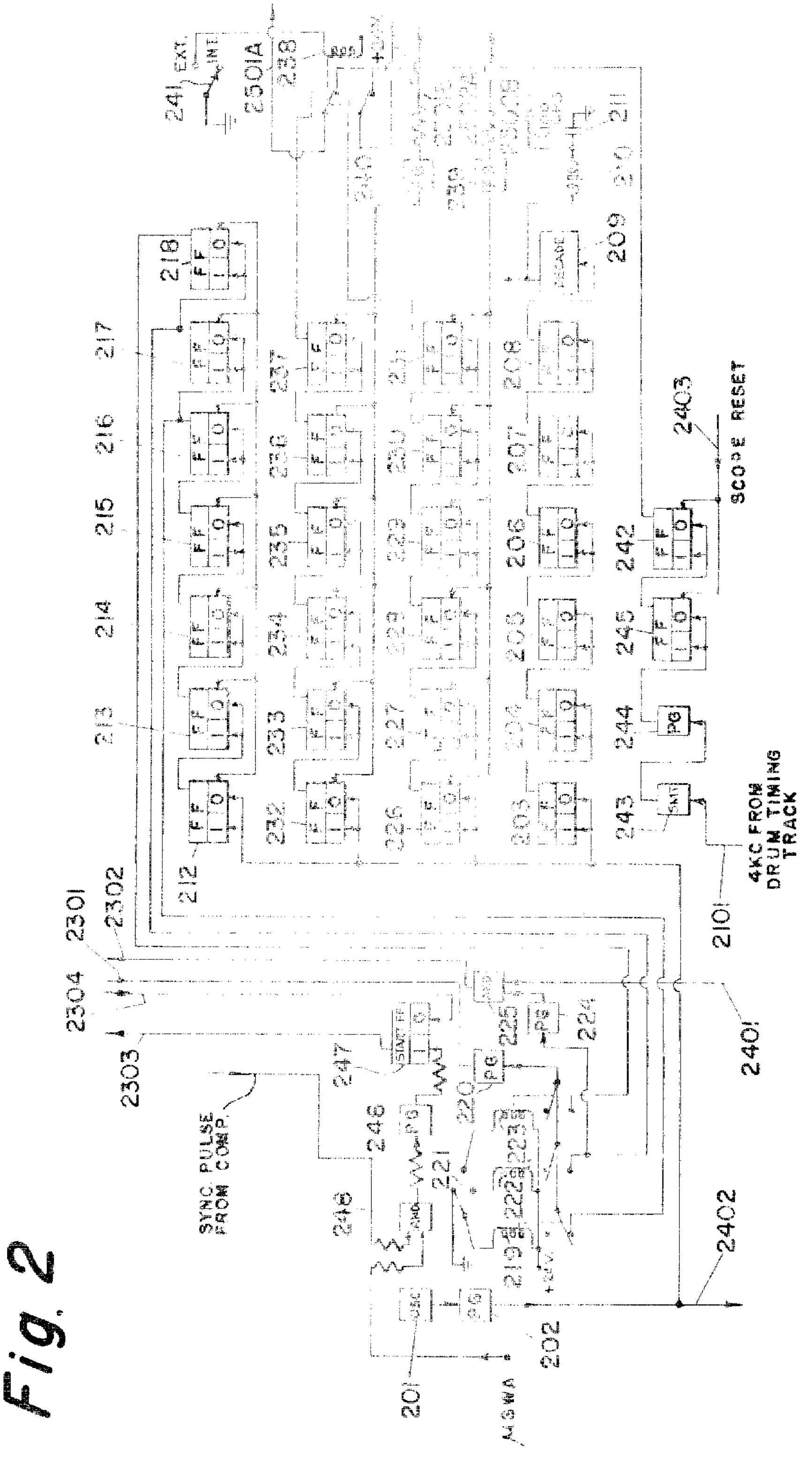
FIG. 2 shows the clock, counters and start flip-flop of the hybrid control unit.

In the following description, each component has a reference character which starts with the figure numeral on which the component appears. For example, the oscillator 201 is on FIG. 2 and the AND gate 301 is on FIG. 3. The interconnections between the FIGS. 2, 3, 4, 5*a* and 5*b* are denoted as follows The first numeral of the reference character for an interconnecting line denotes a figure number on which it appears. The second numeral designates the figure number to which the line extends and the final two numbers are a reference character for a particular line. For example, one of the interconnecting lines at the bottom of FIG. 2 is denoted 2401. The first numeral 2 denotes that it appears on FIG. 2; the second numeral 4 denotes that the line extends to FIG. 4; and the 01 denotes the particular line. Referring to FIG. 4, this same line is denoted 4201.

The relays shown in the circuits are of a conventional type having both normally closed contacts and normally open contacts. As an example, the relay 219 shown in FIG. 2 has normally closed contacts, denoted *nc*, and normally open contacts, denoted *no*. When the relay is not energized, the *nc* contact is connected to the center contact, that is, the contact between the *nc* and the *no* contacts. When the relay is energized, the *no* contact is connected to the center contact.

*Clock, counters, and start flip-flop, FIG. 2*

Referring now to FIG. 2, there is shown a crystal controlled 64 kilocycles oscillator 201 which provides the clock pulses necessary to sequence all operations at the exact time. The output of oscillator 201 is applied to a pulse generator, or pulse amplifier, 202 which drives four different series of bistable multivibrators. These different series of multivibrators are used to divide the primary 64 kc. clock pulses down into the pulse rates necessary to control the different functions which the system is to perform.

In order to keep the speed of the magnetic drums in accurate alignment with the analog control circuitry, a series of flip-flops 203–208 and a decade counter 209 are provided. The primary 64 kc. clock pulse rate is divided by 64 in the six stage binary counter, including flip-flops 203–208. The output of flip-flop 208 is a 1 kc. squarewave which is divided down by 10 in the decade counter 209 to produce a 100 c.p.s. squarewave at the output of decade counter 209. The output of decade counter 209 is filtered by a filter including inductance 210 and capacitor 211 to produce a 100 c.p.s. sinewave which controls the speed of the magnetic drums.

In order to provide 1 kc. squarewaves for presetting the oscilloscopes, the flip-flops 226–231 and the flip-flops 232–237 are provided. The output of flip-flop 231 provides a 1 kc. squarewave which is applied through one of the *no* contacts of relay 238 and over the line 2501B to the preset circuitry associated with oscilloscope B. Similarly, the 1 kc. squarewave output of flip-flop 237 is applied through another *no* contact of relay 238 to the line 2501A which applies the 1 kc. squarewave to the scope A preset circuitry shown in FIG. 5.

The flip-flops 226–231 are reset by pulses applied over line 2502B and through the pulse generator 239 to the reset inputs to flip-flops 226–231. Similarly, the flip-flops 232–237 are reset by pulses applied over line 2502A and through pulse generator 240 to the reset inputs to flip-flops 232–237.

Timing for presetting the oscilloscopes can be either internal or external as determined by manual switch 241. When switch 241 is in its upper, EXT, position, ground potential is applied to the winding of relay 238 thereby energizing it. When switch 241 is in this position, the outputs of flip-flops 231 and 237 are connected through the *no* contacts of relay 238 to the lines 2501A and 2501B. When the switch 241 is in its lower, INT, position as shown, relay 238 is in its unenergized condition and the *nc* contacts are connected to the middle contacts of the relay. This causes an internal timing squarewave from flip-flop 242 to be applied through the *nc* contacts of relay 238 and over lines 2501A and 2501B to scopes A and B. The internal timing train is provided by a timing track on the magnetic drums. This timing track produces a 4 kc. squarewave which is applied over line 2101 to the Schmitt trigger 243 and the pulse generator 244. The output of pulse generator 244 drives flip-flops 245 and 242 which divide the 4 kc. timing track signal down to a 1 kc. squarewave at the output of flip-flop 242. Flip-flops 242 and 245 are reset by reset pulses from the scopes applied to the line 2403.

In order to provide strobe pulses which are fed to the analog-to-digital converter (A/D converter) to control the digitizing of analog seismic data, a series of flip-flops 212–218 is provided. These strobe pulses determine when a sample is to be digitized. There is a choice of ½ millisecond, 1 millisecond, or 2 millisecond strobe pulse sampling rates. The ½ millisecond sampling rate is provided by the output of flip-flop 216 which is connected through the normally open contacts of relay 219 to pulse generator 220, the output of which supplies strobe pulses to the analog-to-digital converter. When relay 219 is energized by application of an energizing voltage thereto, the ½ millisecond strobe pulses from the output of flip-flop 216 are applied to the analog-to-digital converter. The function of selecting the sampling rate is performed by the multiposition switch 221 which, in the position shown, applies a 24 volt energizing voltage to relay 219. When the switch 221 is moved to its center position, a relay 222 is energized thereby applying the output of flip-flop 217 to the delay pulse generator 220 and, subsequently, to the analog-to-digital converter. This results in a train of 1 millisecond strobe pulses being supplied to the analog-to-digital converter. When the switch 221 is moved all the way to its right-hand position, a relay 223 is energized thereby applying the output of flip-flop 218 to the pulse generator 220 and, subsequently, to the analog-to-digital converter. This supplies 2 millisecond strobe pulses to the analog-to-digital converter.

The 1 kc. squarewave obtained from flip-flop 217 is also used to provide timing pulses for preset circuitry which can delay the start of a series of strobe pulses to the digital computer. This delay of the start of a series of strobe pulses is provided to select any desired portion of a seismic trace for conversion. The 1 kc. squarewave from the output of flip-flop 217 is applied to pulse generator 224. The output of pulse generator 224 is a train of 2 microsecond wide pulses which are spaced 1 millisecond apart. These pulses are applied to AND gate 225, the output of which is applied over line 2302 to a preset counter which determines the delay in initiating the digitizing of a seismic trace. AND gate 225 will be open to pass the 1 kc. pulses to the preset counter only if the line 2401 is up. This line 2401 is from the squelch flip-flop and, as will be subsequently explained, the line 2401 will be up only when the squelch flip-flop is in the 0 state which occurs upon the resetting of the preset counter. The termination code pulse or microswitch B pulse (whichever comes first) sets the squelch flip-flop back to 1, thereby preventing the preset counter from being reset while it is counting during the digitizing process or analog conversion process.

In order to start the preset counter in synchronism with the drum, the signal from microswitch A is applied to AND gate 248. When this microswitch A pulse occurs in coincidence with the sync pulse from the computer indicating that the computer is ready to receive data for conversion, AND gate 248 produces an output which is shaped in pulses generator 246, the output of which sets start flip-flop 247 to the 1 condition. Start flip-flop 247 applies an up condition to the line 2303 which is one of three conditions to enable AND gate 301, as will be explained in conjunction with FIG. 3.

Figure 3:
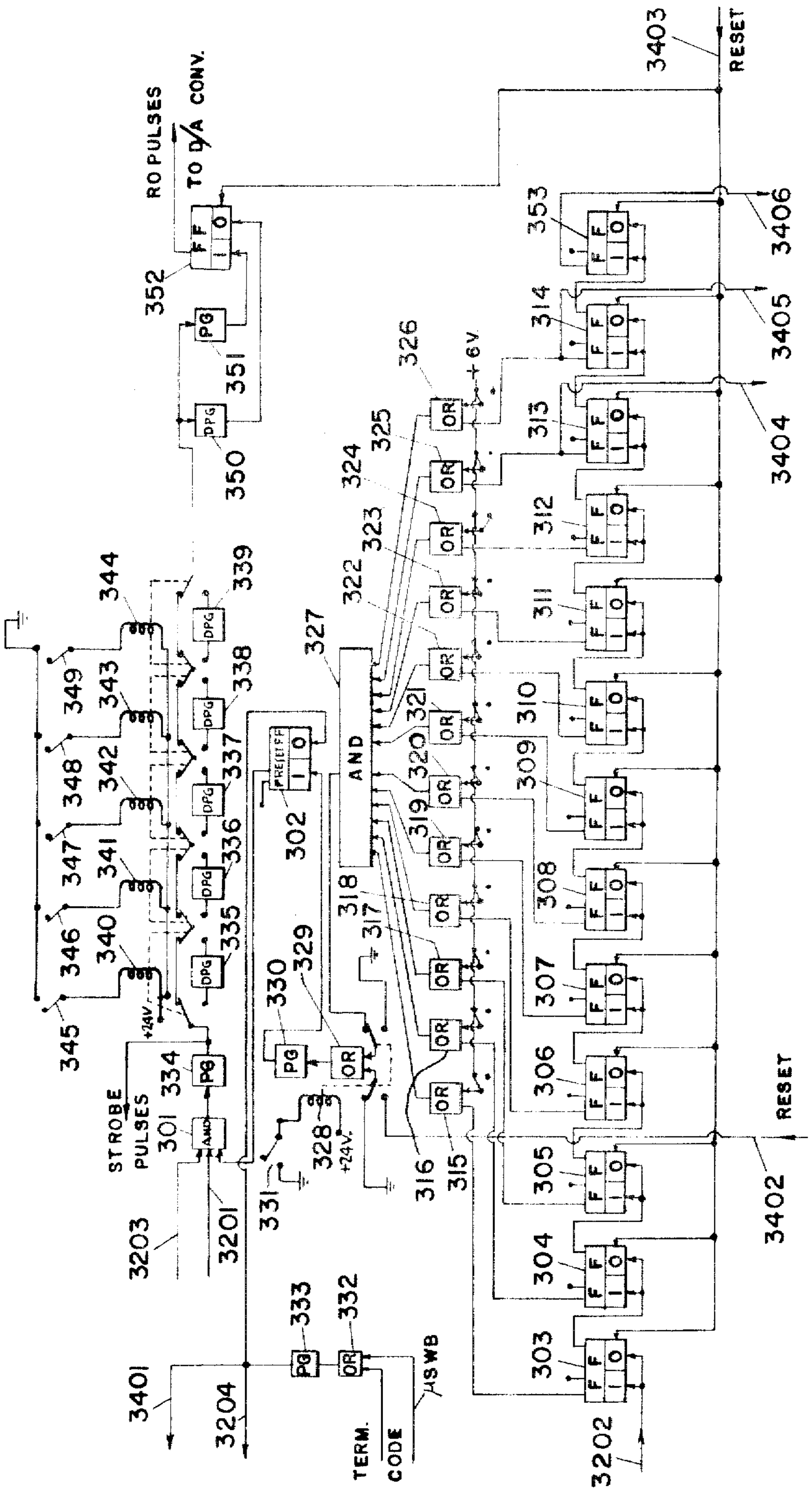
FIG. 3 shows the preset counter, preset flip-flop, strobe pulse and readout pulse outputs of the hybrid control unit.
Figure 4:
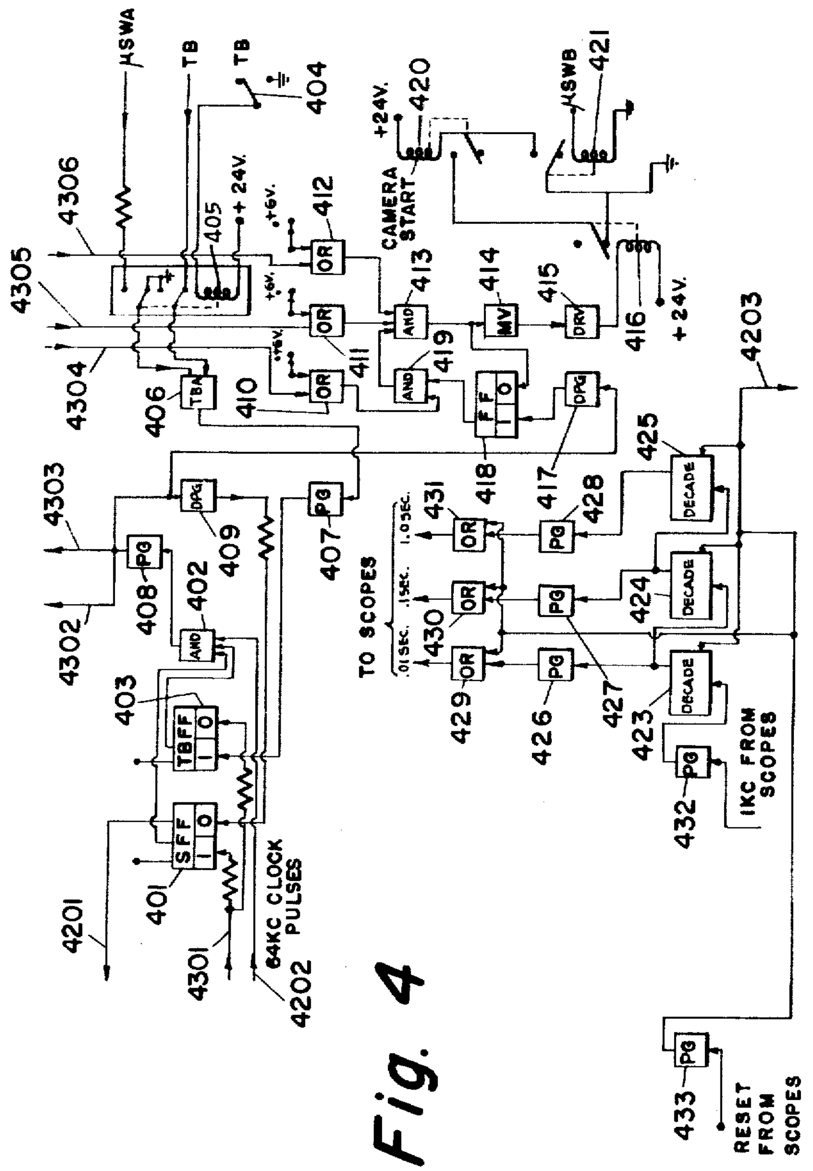
FIG. 4 shows the squelch flip-flop, time-break flip-flop, reset circuitry, and oscillograph camera circuitry of the hybrid control unit.

*Preset counter, preset flip-flop, strobe pulse and readout pulse outputs, FIG. 3*

The output of the start flip-flop which applies an up condition to line 3203 satisfies one of the inputs to AND gate 301. The middle input to AND gate 301 are the strobe pulses at a 1 kc. rate and of selected duration on line 3201. These will be passed through AND gate 301 to the A/D and D/A converters when a preset flip-flop 302 applies a 1 condition to the AND gate 301. Preset flip-flop 302 will be set to a 1 condition at a time after the initiation of a seismic trace, which time is determined by the preset counter including the flip-flops 303–314. These flip-flops are driven by a train of 1 kc. pulses which are present on the line 3202. The 1 outputs of the flip-flops 303–314 are connected to twelve different OR gates 315–326. The second input to each one of these OR gates is connected to a two-position manual switch. When the switch is in its upper position, +6 volts (a 1 condition) is applied to the associated OR gate. When the switch is in its lower position, ground potential (a 0 condition) is applied to the associated OR gate. These switches are used to select a particular delay interval, after which the trace will be digitized. As shown, all switches are in their upper position except the switch at the input to OR gate 324. By manually positioning this switch to its lower position, a preset time interval of approximately ½ second is selected.

The outputs of OR gates 315–326 are all applied as inputs to AND gate 327. AND gate 327 will produce a 1 output only when all of the inputs are in the 1 condition in coincidence. As shown, the outputs of OR gates 315–323 and 325–326 will be 1's by reason of the switches at their inputs being connected to +6 volts. However, the output of OR gate 324 will not be a 1 since the switch at the input is connected to ground potential. OR gate 324 will produce a 1 output only when the output of flip-flop 312 is switched to a 1. The flip-flops 303–314 are connected together to count in a binary manner the pulses applied on the line 3202. After the application of the 1 kc. pulses on the 3202 by reason of the squelch flip-flop being switched to the 0 condition, the first 1 kc. pulse will set flip-flop 303 to the 1 condition, the second pulse will switch flip-flop 304 to the 1 condition, the fourth pulse will switch flip-flop 305 to the 1 condition, the eighth pulse will switch flip-flop 306 to the 1 condition, and so on. The 512th 1 kc. pulse will switch the flip-flop 312 to the 1 condition. This produces a 1 output at the output of OR gate 324 and produces a coincidence of 1's at all of the inputs of AND gate 327. AND gate 327 produces a 1 output which sets preset flip-flop 302. It will be observed that since the 512th 1 kc. pulse produced this coincidence, there was produced a delay of .512 second after the squelch flip-flop was set to a 0. This is the desired preset delay of approximately ½ second.

Each of the flip-flops 303–314 is reset by a reset pulse on line 3403 which occurs upon each revolution of the magnetic drum. The reset pulse is caused by the actuation of a microswitch on the drum or by the time-break signal on the analog magnetic tape. The reset pulse is also applied to the line 3402 and may be used to set preset flip-flop 302 to a 1 condition if no preset delay is desired. Normally, when there is a preset delay, the output of AND gate 327 passes through the normally closed *nc* contacts of relay 328, through OR gate 329 and pulse generator 330 to set the preset flip-flop 302 to a 1 condition. However, when there is no preset delay, a switch 331 is closed to energize relay 328. In this case, a reset pulse on the line 3402 passes through the *no* contacts of relay 328 and through OR gate 329 and pulse generator 330 to set the preset flip-flop 302 to a 1 condition.

Preset flip-flop 302 will be set to a 0 by either a termination code pulse generated by the analog-to-digital converter or by a pulse from one of the microswitches on the magnetic drum. Both of these pulses are applied to OR gate 332 and through pulse generator 333 to the 0 input to the preset flip-flop 302.

When the preset flip-flop 302 and the start flip-flop 247 are both in the 1 condition, 1 kc. strobe pulses will pass through AND gate 301 and pulse generator 334 to the analog-to-digital converter. These strobe pulses are also used to generate readout pulses which are supplied to the digital-to-analog converter. In order to introduce a selected delay between the strobe pulses and the readout pulses, the delay network 335–339 are provided. These delay networks are selectively switched into circuit by the relays 340–344. By manually adjusting switches 345–349, selected ones of the relays 340–344 will be energized thereby introducing the desired delay into the circuit between the strobe pulses and the readout pulses. This delay is desirable where an operation is being performed in which data is being converted to digital form, operated upon, or merely delayed, by the digital computer, and then immediately read out by the readout pulses to an analog form. In this situation, it is necessary to provide a certain delay between the strobe pulses which convert an analog sample to a digital form and the readout pulse which converts the digital number back to an analog representation. This delay is necessary in order for the computer to perform the desired operation and the delays introduced by delay lines 335–339 will be switched into the circuit to provide this required amount of delay.

In order to generate 100 microsecond wide readout pulses, the 100 microsecond delay pulse generator 350, the pulse generator 351 and the flip-flop 352 are provided. The 1 kc. strobe pulses switch flip-flop 352 to the 1 state and, 100 microseconds later, return it to the 0 state. The result is a train of 100 microsecond wide pulses at the output of flip-flop 352. These pulses are used as readout pulses for the digital-to-analog converter.

In order to provide automatic paper record lengths for the oscilloscope camera, the outputs of flip-flops 313, 314 and 353 are applied to a coincidence network which will later be described in conjunction with the description of FIG. 4.

*Squelch flip-flop, time-break flip-flop, reset circuitry, oscillograph camera circuitry, FIG. 4*

In order to insure that only one reset pulse will reset all of the counter flip-flops and to insure that thereafter the flip-flops will not be reset while they are counting, a squelch flip-flop 401 is provided. Squelch flip-flop 401 is set to a 1 by either a termination code pulse or a microswitch B pulse on the line 4301. When squelch flip-flop 401 is in the 1 condition, one of the conditions necessary to pass 64 kc. clock pulses through AND gate 402 is satisfied. The other condition is satisfied by the time-break flip-flop 403 being set to the 1 condition.

Time-break flip-flop 403 is set to a 1 by either the microswitch A pulse or by the time-break pulse from the magnetic drum. A manual switch 404 determines whether the operator selects the time-break or microswitch A as the time 0 base. With the switch 404 in the position shown, the relay 405 is not energized and the time-break pulse passes through the *nc* contacts of the relay to the time-break amplifier 406 which shapes the pulse and applies it to pulse generator 407. The output of pulse generator 407 sets the time-break flip-flop 403 to the 1 condition.

All input conditions for AND gate 402 are now satisfied and the next 64 kc. pulse will pass through AND gate 402 and pulse generator 408 to reset all of the counter flip-flops shown in FIG. 3. Approximately 7 microseconds later the delay pusle generator 409 will reset squelch flip-flop 401 to the 0 condition. This disables AND gate 402 so that only one pulse will be generated to reset the counter flip-flops and this will occur immediately after the time-break or the microswitch A pulse.

In order to provide automatic paper record lengths for the recording oscillograph camera, the outputs of the last three flip-flops in the preset counter are applied respectively over lines 4304, 4305 and 4306 to the OR gates 410, 411 and 412. The other input to each of these OR gates is connected to a switch which can be used to place +6 volts, a 1 condition, on the inputs to the OR gates. If, for example, a 4-second record length is chosen, +6 volts is connected to the inputs of OR gates 410 and 411. At approximately 4 seconds after the initiation of counting by the preset counter, the flip-flop 353 will be set to 1 thereby applying a 1 condition over the line 4306 to OR gate 412. This produces coincidence of 1 conditions at all three inputs to AND gate 413 which switches one shot multivibrator 414 causing relay driver 415 to energize the relay 416. This stops the camera record at the desired record length.

Delay pulse generator 417 sets a flip-flop 418 to a 1 approximately 100 milliseconds after either the time-break or the microswitch A pulse. Therefore, AND gate 419 can produce an output which produces coincidence at AND gate 413 only after the time-break or the microswitch A pulse. This prevents the relay 416 in the camera record control circuit from being energized when all of the flip-flops in the counters are being reset.

The camera start circuitry is arranged so that the motor which drives the photographic record past the oscillograph will be started in synchronism with the microswitch B pulse from the magnetic drum and will be stopped at a selected record length. In order to do this, camera start relay 420 is connected between +24 volts and the normally open contact of relay 421. Relay 421 is energized upon the occurrence of the microswitch B pulse. When this occurs, the no contacts of relay 421 are closed, thereby applying ground to the bottom of camera start relay 420 and energizing that relay. When this occurs, the camera start relay 420 is locked in by a circuit through the *no* contacts of relay 420 and through the normally closed *nc* contacts of relay 416 to ground. Therefore, the camera start relay will be energized during the time period between the occurrence of the microswitch B pulse and the energization of relay 416 which breaks the circuit from ground to the camera start relay 420. Therefore, the camera start relay has been energized for the selected time to give the desired record length.

It will be appreciated that various other relay contacts may be included in the energizing circuit for camera start relay 420 so that the oscillograph camera can be started manually.

In order to provide timing lines for the oscilloscopes, the decade counters 423, 424 and 425 are provided. The outputs of these decade counters are respectively applied to pulse generators 426–428 and OR gates 429–431 to provide the .01 second, .1 second and 1.0 second timing lines for the oscilloscopes. The input to the decade counters is a 1 kc. train of pulses applied to pulse generator 432. This 1 kc. train of pulses is taken from the scopes and originates with the 1 kc. output on either line 2501A or 2501B depending on whether scope A or scope B is controlling the timing. This 1 kc. is divided down by decade counter 423 to produce the .01 second timing lines at the output of OR gate 429. The 1 kc. is further divided down by decade counter 424 to produce the .1 second timing line at the output of OR gate 430 and further divided down by decade counter 425 to produce the 1.0 second timing line at the output of OR gate 431. The decade counters are reset from the reset applied to the scopes. This reset is applied to pulse generator 433 which resets the decade counter and also produces a timing line at the output of OR gates 429–431.

*Scope preset circuitry, FIGS. 5a and 5b*

In order to delay the initiation of the scope sweep to correspond with the delay in converting a digitized trace back to analog form, the circuitry of FIGS. 5*a* and 5*b* is provided. This circuitry provides a selected delay between the time-break or microswitch A pulse and the start of the sweep for the oscilloscopes.

The delay between the time-break or microswitch A pulse and the start of the scope sweep is provided by a preset counter including the flip-flops 501–512. These flip-flops count 1 kc. pulses applied over the line 5201A, through pulse generator 513 to the AND gate 514. AND gate 514 will pass the 1 kc. pulses only when a preset flip-flop 515 has been set to the 1 condition. This occurs in response to either the time-break pulse or the microswitch A pulse. Both of these pulses are applied to the manual switch 516 which enables the operator to select either of these two pulses. The time-break or the microswitch A pulse is applied over lines 516B and 516A to all of the flip-flops 501–512 to reset them. It is also applied to delay pulse generator 517 which, after 5 microseconds, sets the preset flip-flop 515 to a 1. Thereafter, 1 kc. pulses are passed through AND gate 514 and pulse generator 518 and over the lines 518B and 518A to the flip-flop 501. The preset counter thereafter counts these 1 kc. pulses and after a preselected number of pulses AND gate 519 will produce an output which initiates the start of the oscilloscope sweep.

In order to select the time delay, OR gates 520–531 are provided. One input to each OR gate is from an associated one of the flip-flop 501–512. The other input to each OR gate is from a manual switch which may be positioned to apply +6 volts, 1 input, to the OR gate or a 0 input to the OR gate. Only when the output of each OR gate 520–531 is a 1 will the AND gate 519 produce an output. Therefore, by positioning a selected switch at the input to one of the AND gates to the position that does not apply +6 volts to the OR gate, there can be selected a particular time delay. As an example, all of the switches are shown connected to +6 volts except the switch at the input of OR gate 528. Therefore, the output of OR gate 528 is a 0 and the AND gate 519 will not produce an output until all inputs are 1's coincidentally. This occurs only when the counter has counted 256 1 kc. pulses, thereby setting flip-flop 509 to the 1 condition. When this occurs, OR gate 528 will produce a 1 output thereby satisfying all input conditions to AND gate 519 and producing a 1 output.

The 1 output of AND gate 519 is applied over lines 519A and 519B and through the normally closed *nc* contacts of relay 532 and through the OR gate 533 and pulse generator **533*a* to set the preset flip-flop 534. This sets preset flip-flop 534 to the 1 condition. The 1 output of preset flip-flop 534 enables pulse generator 535 to produce a start sweep signal which is applied to the scope to start its sweep. If the preset delay is zero, a switch 536 is positioned to apply an energizing voltage to relay 532**. When this occurs, the time-break or microswitch A pulse passes directly through the *no* contacts of relay 532, through OR gate 533 and through the pulse generator **533*a* to set preset flip-flop 534** and to produce a start sweep signal.

The three-position switch 516 provides two choices for initiating the scope sweeps. The three positions of the switch are labeled TB, recycle and gate. In the TB position the sweep start is controlled by the preset time and the time-break pulse. In the recycle and gate positions, the sweep start is controlled by the microswitch A pulse and the preset time.

In order to provide timing lines to the scopes, the 1 kc. pulses, which are the output of pulse generators 518, are applied through AND gate 540 and the contacts of relays 541 and 542 to the scopes. If the A scope is to control the timing lines, the switch 543 is set in the A position which energizes relay 542. When relay 542 is energized, +6 volts is applied through its *no* contacts to the AND gate 540 thereby enabling that AND gate to pass 1 kc. pulses. The 1 kc. pulses are applied through the *nc* contacts of relay 541 and through the *no* contacts of relay 542 to the output of the scopes.

When the switch 516 is in the recycle position, the contact **516*c* applies ground potential to relay 541 thereby energizing that relay. In this case, the 1 kc. pulses must pass through AND gate 544. This AND gate 544 is enabled to pass pulses only when flip-flop 545 is in the 1 condition. This occurs between the start of sweep pulse and the end of sweep pulse. During this interval, 1 kc. pulses will be passed through AND gate 544**, through the *no* contacts of relay 541 and through the *no* contacts of relay 542 to the output to scopes.

*Digital field recording system, FIG. 6*

In seismic prospecting, it is frequently desirable to record the seismic data directly in digital form in the field. The direct recording of seismic signals in digital form is desirable because of the ease of processing digital tapes back at a central processing center and because of the reduced possibility of distortion of digital signals during further processing over those recorded in analog form.

Referring now to FIG. 6, there is shown a seismic field layout including a seismic disturbance 601 which commonly takes the form of a shot of dynamite. Positioned directly adjacent the seismic disturbance is a time-break geophone 602 which indicates the initiation of the seismic disturbance. Further geophones 603, 604, and 605 are provided to detect the reflection of the seismic energy from subsurface interfaces. Commonly, a large number of geophones are provided but, for convenience, only three have been shown in FIG. 6.

The seismic signals produced by geophones 603–605 are amplified in amplifiers indicated at 606. The three seismic signals produced by geophones 603–605 are sequentially sampled by commutator 607. This commutator is driven by an advance pulse from buffer register 611 which is produced each time that the buffer register receives a sample. That is, when the buffer register 611 receives the first digitized sample from geophone 603, it produces an advance pulse which enables commutator 607 to apply the output of geophone 604 to A/D converter 610. When the buffer register 611 receives the digitized sample from geophone 604, it produces another advanced pulse which enables commutator 607 to apply the output of geophone 605 to A/D converter 610. The sampling continues until all geophones have been sampled. Then, the next strobe pulse from hybrid control unit 608 starts the sampling again; the first geophone is sampled, then the second and so on until all have been sampled again.

The initiation of the seismic disturbance is detected by time-break geophone 602 which produces a time-break pulse. This time-break pulse is amplified in time-break amplifier 609 and is applied to hybrid control unit 608.

In response to the time-break pulse, the hybrid control unit 608 produces a repetitive series of strobe pulses which are applied to analog-digital converter 610. The analog-digital converter 610 converts each of the seismic signal samples at the output of commutator 607 to the digital representations of these samples. The digitized samples at the output of analog-to-digital converter 610 are applied to the buffer register 611. Buffer register 611 has associated therewith logic circuitry which produces a sync pulse indicating that the register is free to receive digital samples and a termination code pulse indicating that the buffer register is full and that no further digital samples should be applied to it.

This register 611 is quite useful when it is desired to change the format of the digital recording so that the tapes can be used with another type of computer. When a register is present, it is possible to change this format without any further change in the digital recording equipment. As an example, consider the situation in which analog-to-digital converter 610 is supplying twelve bit digital words, or samples, to the buffer 611 which in turn transfers these twelve bit words to magnetic tape 612. The words are being recorded in a twelve bit format which is suitable for use with some computers. However, suppose it is now desired to record words in an eight bit format which is suitable for use with another computer. When a buffer register 611 is provided, it is a simple matter to transfer eight bits at a time out of the register to the magnetic tape for recording. The four bits that are left over from the original twelve bit word are retained in the register and a new eight bit sample is transferred from analog-to-digital converter 610 to register 611. Now, the register contains sixteen bits. These sixteen bits are transferred, eight bits at a time to the digital magnetic tape 612. In this manner, the digital recording proceeds with the samples being transferred to digital magnetic tape 612, eight samples at a time instead of the twelve bit format used previously. It will be appreciated that other changes in recording format are possible merely by proper programming of the buffer register.

The digital samples are transferred from buffer register 611 to a digital magnetic tape 612 wherein the samples are recorded in a reproducible form. The digital magnetic tapes may be transported back to a central processing unit for further processing.

Frequently, it is desirable to convert the seismic signals to a visible form in the field so that the operators may determine the effectiveness of their prospecting. In order to do this, there is provided a digital-to-analog converter 613, a commutator 614, amplifier 615, and a recording oscillograph 616. The digital samples from buffer register 611 are converted back to analog form in digital-to-analog converter 613. This is accomplished under control of readout pulses which are produced by hybrid control unit 608 as previously described in conjunction with FIG. 1*a*. The analog samples at the output of digital-to-analog converter 613 are decommutated back into three separate seismic signals by commutator 614 under control of the advance pulses. These seismic signals are amplified in amplifiers 615 and applied to a recording oscillograph 616 which displays the signals in visible form. As in the system described in conjunction with FIGS. 1 and 1*a*, the recording oscillograph is started and stopped under control of hybrid control unit 608 and timing lines are applied to the visible records by hybrid control unit 608.

*Hybrid control unit, FIG. 7*

Referring now to FIG. 7, there is shown a clock 701 which provides a source of accurately timed 64 kc. clock pulses. These clock pulses are used to time the various operations which are performed by the field recording system.

One of these operations is the generation of strobe pulses which digitize a seismic trace so that the digital samples may be recorded on magnetic tape. Similarly, readout pulses are generated to control the conversion of the digitized seismic data back to analog form. The strobe and readout pulses are initiated in synchronism with the initiation of the seismic disturbance as indicated by the time-break pulse. In order to provide strobe pulses at different sampling rates, the 64 kc. clock pulses are counted down in a binary counter 702. The stages of this counter provide a 2 kc. output, a 1 kc. output and a .5 kc. output. These outputs are applied to a sampling rate selector 703 by means of which the operator can select the sampling rate from one of the three inputs applied to the selector. The selected sampling rate pulses for the strobe and readout pulses are applied to an AND gate 704. The output of AND gate 704 is the strobe pulse output to the analog-to-digital converter 610.

The initiation of this train of strobe pulses must be timed so that it occurs when the buffer register is ready for new digitized samples and it must be timed so that the pulse train starts at a selected time after the time-break signal. In order to synchronize the initiation of these pulses to start after the register is ready for digitized samples, AND gate 705 and start flip-flop 706 are provided. When the register is ready for digital samples, it produces a sync pulse which is applied to AND gate 705. Upon the occurrence of the time-break pulse, the AND gate 705 produces a pulse which sets start flip-flop 706 to the 1 condition. When start flip-flop 706 is in the 1 condition, one of the conditions for passing the strobe pulse through AND gate 704 is satisfied.

The other condition is satisfied by the preset delay circuitry including AND gate 707, preset delay counter 708, and a preset flip-flop 709. The preset delay circuitry delays the initiation of strobe pulses for a selectable increment of time after the initiation of the seismic signals by the production of a seismic disturbance. In this manner, only a selectable portion of the seismic signal is digitized.

Often in seismic recording it is desirable to delay the recording for an increment of time after the time-break signal. This is for the reason that the first portion of the seismic signal includes extraneous noise of high amplitude which is not at all useful for seismic interpretation. In analog seismic recording, there is often provision in the seismic amplifier for squelching the first portion of the seismic signal, for example, a portion perhaps one second long after the time-break pulse. The same function can be accomplished with the preset delay circuitry by setting the preset delay so that the recording will not be initiated until the desired time increment after the time-break pulse, perhaps one second after the time-break pulse.

Upon the generation of the seismic disturbance, the time-break pulse sets the time-break flip-flop 710 to the 1 condition. This enables an AND gate 711 to pass the next clock pulse. This clock pulse is transferred through delay 712 to set a squelch flip-flop 713 to the 0 condition. The zero output of squelch flip-flop 713 enables AND gate 707 to pass 1 kc. pulses to the preset delay counter 708. The preset delay counter counts a selected number of 1 kc. pulses and after this selected number has occurred, the preset delay counter 708 produces an output which sets the preset flip-flop 709 to the 1 condition. This enables AND gate 704 to pass strobe pulses to the analog-to-digital converter and thereby initiate the digitizing of the seismic signals.

These same strobe pulses are also used to produce readout pulses which convert a digitized seismic signal back to analog form. In certain operations, it is desirable to have a delay between a strobe pulse, which digitizes a trace, and a readout pulse, which converts the digital sample back to analog form. In order to provide this delay, a variable delay unit 715 is provided. This delay unit 715 provides a delay between a strobe pulse and a readout pulse such that the digital samples can be transferred between analog-to-digital converter 610, buffer register 611 and digital-to-analog converter 613. In most situations in the field, no delay between strobe and readout pulses will be required.

In digitizing of seismic traces by the strobe pulses is terminated by a termination code pulse from the buffer register indicating that it has received all the information it can handle. The terminal code pulse is also applied to the zero input of time-break flip-flop 710 to set the time-break flip-flop back to the zero condition.

In order to place the digital recording system in condition for operation, the operator manually depresses a start button prior to setting off the shot which creates the seismic disturbance. This start button produces a start pulse which is used to set squelch flip-flop 713 to the 1 condition. This enables AND gate 711 to pass the next 64 kc. clock pulse which occurs after the time-break flip-flop 710 has been set to the 1 condition. The output of AND gate 711 is used to reset all of the counters to place them in a condition for the next cycle of operation. The reset pulse is delayed for a short interval of time in delay circuit 712 which then sets the squelch flip-flop 713 to the 0 condition. The squelch flip-flop 713 is in the 1 condition only for a period of time between the start pulse and the next time-break pulse. It is only during this short interval of time that AND gate 711 may be enabled to produce a single reset pulse. In this manner, there is eliminated the possibility that a reset pulse will be produced during the time that the counters are counting. This prevents incorrect operation of the counters.

The control circuitry of FIG. 7 also performs the function of selecting the record length for the recording oscillograph 616. As indicated on FIG. 7, the drive motor 714 for the recording oscillograph is started manually. In order to select the record length, record length selector 718 is provided. The outputs of the preset delay counter 708 are applied to the record length selector. These outputs occur at different time intervals after the time-break pulse. Record length selector 718 provides means for the operator to select one of these pulses for stopping the camera drive motor 714.

In order to provide timing lines for the recording oscillograph, a counter 716, and decade counters 717 are provided. The counter 716 divides the 64 kc. clock pulses down to a train of 1 kc. pulses. Decade counters 717 divide the 1 kc. pulse train down to provide timing lines at every .01 second, every .1 second, and every 1.0 second.

It will be appreciated that the logic circuitry for performing the functions shown in block form in FIG. 7 will substantially coincide with the logic circuitry described in detail in FIGS. 2, 3 and 4.

*Correlation with hybrid analog-digital techniques, FIG. 8*

The hybrid analog-digital processing system of this invention is particularly suitable for performing correlation. Correlation techniques are used extensively in seismic data processing to improve the signal-to-noise ratio of seismic traces. Seismic traces may be autocorrelated, that is, the seismic trace is correlated against itself, or a cross-correlation may be performed bettween two different seismic traces.

In both cases, two data components are multiplied one by another and the results of the multiplication are summed to form one point on a correlation function. The two components are then shifted by a small increment of time with respect to one another and the two components are again multiplied by each other. The results are summed to form another point on the correlation function. The steps of shifting, multiplying and summing are repeated until one data component has been shifted all the way through the other data component. As an example of correlation, consider the seismic trace shown in FIG. 8*a* and the portion of another seismic trace shown in FIG. 8*b*. When the traces shown in FIGS. 8*a* and 8*b* are cross-correlated, there is obtained a cross-correlation function as shown in FIG. 8*c*.

In order to perform the cross-correlation digitally, the traces of FIGS. 8*a* and 8*b* are divided into sampling intervals, shown along the abscissa. In cross-correlation, the digital value of the trace of FIG. 8*a* at each sampling interval is multiplied by the digital value of the trace of FIG.8*b* at corresponding sampling intervals. That is, the value of the trace of FIG. 8*a* at the interval —8 is multiplied by the value of the trace of FIG. 8*b* at a sampling interval of —8; the corresponding values at sampling intervals —7, —6, —5, etc., are multiplied together to obtain seventeen products. These are summed to form the quantity which is one point on the cross-correlation function of FIG. 8*c* at $t=0$. Next, the trace of FIG. 8*b* is shifted by an incremental amount, for example, equal to one sampling interval, and the products are again obtained. These samples are added together and the sums provide a second value of the cross-correlation function. This process continues until the value of the cross-correlation function has been obtained for each interval of time. This cross-correlation function is shown in FIG 8*c*.

When such a correlation operation is performed digitally, a large amount of computation time is expended in obtaining all of the products and summing them for each of the sampling intervals. In accordance with one aspect of the present invention, the time required for correlation is reduced considerably by converting the digital seismic data back to analog form and performing the correlation on analog equipment. The analog representations of the two components can be serially multiplied in a very short time in an analog multiplier. The product which is the output of the analog multiplier can be integrated simultaneously with the serial multiplication. This integration corresponds with the summing of the products in a digital correlation. By performing the correlation with analog circuits, it can be performed in a very short time.

Further saving in correlation time can be effected by using a combination of digital and analog processing in accordance with this invention. When the traces are in digital form, they can be time compressed. That is, the sampling interval can be reduced considerably without loss of information providing that all of the samples are retained. By using a combination of digital time compression and analog correlation, a considerable reduction in time required to perform a correlation operation can be obtained over the time required to perform such a correlation operation using only digital techniques or only analog techniques by themselves.

FIG. 8 shows an arrangement of the hybrid processing system of this invention which is suitable for performing correlation in this manner. In order to facilitate the explanation of this technique, a specific example will be considered. Consider the correlation of two seismic traces, each of which is 4 seconds long. Each of the seismic traces is digitized to 2000 samples at a sampling interval of 2 milliseconds.

Both of these seismic traces are stored in digital registers in digital computer 801. These seismic traces have been read into digital computer 801 by means which have already been described. Consider that each of the 2000 samples occupies a time interval of 2 microseconds. By compressing the traces so that there is no time interval between samples, the 2000 samples can be compressed into an interval of 40 milliseconds. That is, each of the two traces is read out of digital computer 801 to one of the two digital-to-analog converters 802 and 803 in 40 milliseconds.

Digital-to-analog converters 802 and 803 provide analog representations of the traces at the outputs thereof. These outputs are applied to an analog multiplier 804 which serially multiplies the two traces, one by the other. The output of analog multiplier 804 is applied to an integrator 805 which performs the function of summing the products and provides as an output a quantity representative of one point on the correlation function. This quantity is amplified in amplifier 806 and converted back to digital form in analog-to-digital converter 807. The quantity is then stored in digital computer 801. Suitable circuits for the multiplier 804 and the integrator 805 are shown on pages 15 and 11, respectively, of Korn and Korn, Electronic Analog Computers, McGraw-Hill Book Co., 1952.

Next, one of the digital traces is shifted by 2 milliseconds with respect to the other and the time shifted digital traces are compressed in time. The traces are again converted to analog form in digital-to-analog converters 802 and 803, the traces are multiplied in multiplier 804, integrated in integrator 805, and the resultant quantity is converted to digital form and stored as another point on the correlation function.

There will now be oppreciated the many advantages of performing correlation with a combination of analog and digital techniques in accordance with this invention. First, the analog multiplication and integration can be performed in a much shorter time than would be required to perform a digital multiplication of all sample values and a summing of the products. Secondly, since the seismic traces are stored in digital form in digital computer 801, it is a simple matter to shift the traces, one with respect to another, by a selected increment of time before performing each multiplication and integration operation. The digital computer provides an accurate and fast manner of shifting the traces by the selected increments. Further, the shifting is performed automatically, without any attention from the operator. The third advantage of using a combination of analog and digital techniques is that the digital traces can be time-compressed to provide a further savings in operation time over that which would be available by using solely analog techniques.

Referring again to the example of two 4-second seismic traces, the correlation operation performed in accordance with this invention requires that every 40 milliseconds one trace is shifted 2 milliseconds at a time with respect to the other trace and then multiplied and integrated until the two traces have been completely correlated. This requires a time shift of 2 milliseconds, multiplication, and integration, each repeated 2000 times. When an autocorrelation function is being performed, this operation may be completed in about 80 seconds. For a cross-correlation of two traces, this time will be doubled.

While a particular embodiment of the invention has been shown and described, it will, of course, be understood that various other modifications may be made without departing from the principles of the invention. The appended claims are, therefore, intended to cover any such modifications within the true spirit and scope of the invention.

What is claimed is:

1. A system for processing seismic data recorded in analog form on a reproducible medium having means for reproducing said analog seismic data as an output comprising:

- an analog-to-digital converter, the output of said reproducible medium being applied to the input of said analog-to-digital converter,
- a digital data processing system, the output of said analog-to-digital converter being applied to the input of said digital data processing system,
- a digital-to-analog converter, the output of said digital data processing system being applied to the input of said digital-to-analog converter,
- control circuitry including:
  - a source of clock pulses,
  - means responsive to said clock pulses for synchronizing said reproducible medium with said analog-to-digital converter so that said analog seismic data recorded on said reproducible medium is converted to a digital form in synchronism with said clock pulses,
  - means for applying said clock pulses to said analog-to-digital converter so that the digital representation of said seismic data is transferred to said digital processing system, and
  - means for applying said clock pulses to said digital-to-analog converter so that said digitized seismic data are converted back to an analog form, and
- preset delay circuitry including:
  - means driven by said reproducible medium for producing a signal indicating the beginning of said analog seismic data as an output from said reproducible medium,
  - means for selecting a particular clock pulse occurring a selected time increment after said signal indicating the beginning of said analog seismic data, and
  - means for initiating the conversion of said analog seismic data to digital form by said analog-to-digital converter in response to said particular clock pulse whereby only a selected portion of said seismic data is converted to digital form.

2. The system recited in claim 1 and a monitor for visually displaying a signal applied to the input of said monitor in response to a start signal applied to said monitor,

- means for selecting a particular clock pulse for application to said monitor as a start signal, and
- means for applying the output of said digital-to-analog converter as an input to said monitor so that a visual observation can be made of the quality of the seismic data which has been digitized and transferred to said digital processing system.

3. The system recited in claim 2 and monitor preset delay circuitry including

- means driven by said reproducible medium for producing a signal indicating the beginning of said analog seismic data as an output from said reproducible medium,
- means for selecting a particular clock pulse occurring a selected time increment after said signal, and
- means for applying said particular clock pulse to said monitor as a start signal.

4. In combination with a seismic data processing system in which analog seismograms stored on a reproducible medium are converted to digital form by an analog-to-digital converter for input into a digital computer, said reproducible medium having associated therewith reproducing means for producing said analog seismograms as an output and means for producing a signal indicative of the beginning of said seismogram, preset delay circuitry for selecting only a portion of said seismogram for conversion to digital form including:

- a clock circuit repetitively producing accurately timed clock pulses,
- means responsive to said signal indicative of the beginning of said seismogram for selecting a particular clock pulse after said signal, and
- means responsive to said particular clock pulse for initiating said analog-to-digital conversion.

5. The system recited in claim 4 wherein said means for initiating said analog-to-digital conversion includes

- a gating circuit, said clock pulses being applied to said gating circuit, and
- means for applying said particular clock pulse to said gating circuit so that said gating circuit is opened to produce at the output thereof a train of strobe pulses, said strobe pulses being applied to said analog-to-digital converter to digitize said analog seismic data.

6. The system recited in claim 5 further including a digital-to-analog converter, the output of said digital computer being applied to said digital-to-analog converter, and

- delay means for producing a selectable delay, said strobe pulses being applied to said delay means, said delay means producing a train of readout pulses which are applied to said digital-to-analog converter to convert said seismic data back to analog form, said delay means providing selectable delays which are of sufficient duration to permit said digital computer to perform desired operations on said seismic data.

7. A seismic data processing system in which analog seismograms stored on a reproducible medium are converted to digital form by an analog-to-digital converter for input into a digital computer for further handling, comprising

- means for visually monitoring said digitized seismic information, and
- a hybrid control unit including:
  - a clock circuit repetitively producing accurately timed clock pulses,
  - a digital-to-analog converter, the output of said analog-to-digital converter being applied to said digital-to-analog converter, the output of said digital-to-analog converter being applied to said monitoring means,
  - means for selecting a first clock pulse for initiating said analog-to-digital conversion,
  - means responsive to a second clock pulse in accurately timed relation with said first clock pulse for starting said digital-to-analog conversion, and
  - means responsive to a third clock pulse in accurately timed relationship to said first and said second clock pulses for initiating the sweep of

BEST AVAILABLE COPY said monitoring means so that said digitized information can be visually monitored to determine the quality of the digital signals which are being applied to the input of said digital computer.

8. The seismic data processing system recited in claim 7 wherein said means for selecting a first clock pulse for initiating said analog-to-digital conversion includes means associated with said reproducible medium for producing a signal indicative of the beginning of said analog seismic data as an output from said reproducible medium, means responsive to said signal for counting clock pulses occurrring after said signal, a gating circuit, said clock pulses being applied to said gating circuit, and means responsive to said counting means for opening said gating circuit upon the occurrence of a selected particular clock pulse after said signal to produce at the output of said gating circuit a train of strobe pulses, said strobe pulses being applied to said analog-to-digital converter to digitize only a selected portion of said analog seismic data.

9. The system recited in claim 8 further including means for producing a selectable delay, said strobe pulses being applied to said last-named means, said last-named means producing a train of readout pulses which are applied to said digital-to-analog converter to convert said seismic data back to analog form, said last-named means providing selectable delays which are of sufficient duration to permit said digital computer to perform desired operations on said seismic data.

10. A system for processing seismic data received at spaced points in the vicinity of a seismic disturbance comprising:

an analog-to-digital converter, said seismic data being applied to an input of said analog-to-digital converter, a digital register, the output of said analog-to-digital converter being applied to the input of said digital register, a digital recording system, the output of said digital register being applied to the input of said digital recording system, control circuitry including:

a source of clock pulses, means responsive to the initiation of the seismic data for producing a train of strobe pulses in timed relation with said clock pulses, means for applying said strobe pulses to said analog-to-digital converter to synchronize the conversion of said seismic data to digital data, means for transferring said digital data from said analog-to-digital converter to said digital register, and means for transferring said digital data from said digital register to said digital recording system.

11. A digital field recording system for recording seismic signals produced at a plurality of geophones in response to the detection of a seismic disturbance comprising:

a commutator for successively sampling the seismic signal at each of said geophones, an analog-to-digital converter for converting each sampled seismic signal to a digital representation, a digital register for storing said digital representations, a digital magnetic recording system, control circuitry including:

a source of clock pulses, means responsive to the generation of said seismic disturbance for producing a train of strobe pulses in timed relation with said clock pulses, means for applying said strobe pulses to said analog-to-digital converter to synchronize the conversion of said seismic signal to digital data, means for transferring said digital data from said analog-to-digital converter to said digital register, and means for transferring said digital data from said digital register to said digital magnetic recording system.

12. The system recited in claim 11 and preset delay circuitry for delaying the conversion of said sampled seismic signals to digital form for a selectable delay after the generation of said seismic disturbance so that only a usable portion of said sampled seismic signals will be recorded, said preset delay circuitry including:

a preset delay counter, means responsive to said generation of said seismic disturbance for applying said clock pulses to said preset delay counter, and an AND gate, said strobe pulses being applied to said AND gate and the output of said preset delay counter being applied to said AND gate so that said AND gate passes said strobe pulses after said preset delay counter has counted a selectable number of clock pulses, the output of said AND gate being applied to said analog-to-digital converter so that said sampled seismic signals are converted only after a selectable increment of delay after said generation of said seismic disturbance.

References Cited

UNITED STATES PATENTS

| | | | |
|---|---|---|---|
| 3,119,993 | 1/1964 | Vesper | 340—347 |
| 3,134,957 | 5/1964 | Foote et al. | 340—15.5 |

ROBERT C. BAILEY, *Primary Examiner.*

O. E. TODD, JR., *Assistant Examiner.*